MARK CROSBY.

Improvement in Sofa-Beds.

No. 4,990. Reissued July 16, 1872.

WITNESSES:

Sylvanus Walker

George E. Carter

INVENTOR:

Mark Crosby

AM. PHOTO-LITHOGRAPHIC CO. N.Y. (OSBORNE'S PROCESS.)

UNITED STATES PATENT OFFICE.

MARK CROSBY, OF BOSTON, MASSACHUSETTS.

IMPROVEMENT IN SOFA-BEDS.

Specification forming part of Letters Patent No. 127,029, dated May 21, 1872; reissue No. 4,990, dated July 16, 1872.

Specification describing certain Improvements in Sofa-Beds, invented by MARK CROSBY, of Boston, in the county of Suffolk and State of Massachusetts.

My invention consists in arranging the upholstered part of the back of a sofa so that it will turn down on a pulley-fulcrum which travels in a groove of edge-piece, so as to form a section of bed; secondly, it consists in combining with the sofa-frame and adjustable back a seat-frame, which is entirely detachable and independent of the sofa-frame.

Figure 1:
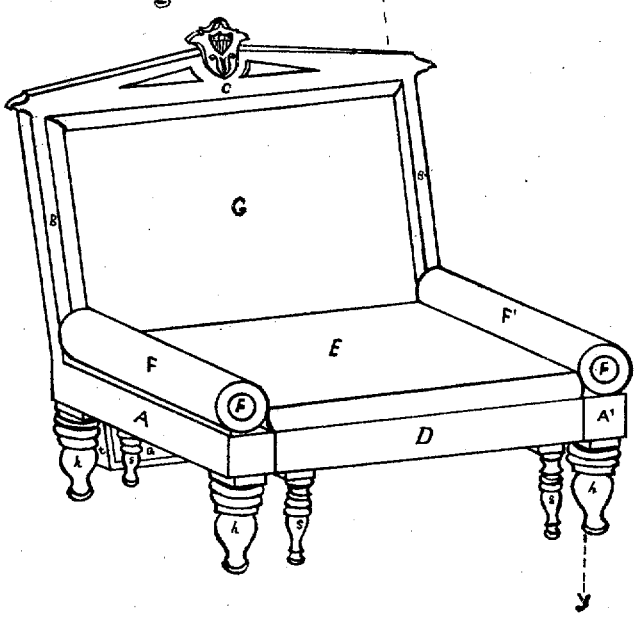
Figure 2:
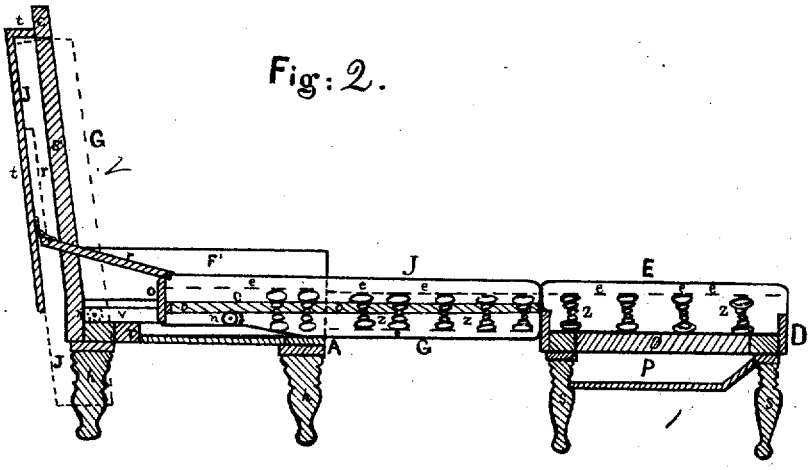

Figure 1 is a perspective view of my invention as a sofa. Fig. 2 is a longitudinal section of the bedstead in its open or extended condition in the direction of dotted lines *x y*, Fig. 1.

A A′ represent the end pieces of the frame, from the rear of which extend uprights B B′, with a top cross-piece, C, forming the back finish-frame. The end pieces A A′ are provided with four legs, one at each corner, *h h h h*, which may be provided with casters in the usual manner. D is the front of the seat-frame, which has an upholstered cushion, E, in the usual manner, except being disconnected from the arms and back, and having four legs also, *s s s s*, which may be provided with casters, so as to admit of being drawn out entirely from the frame A B C, and having no connecting mechanism therewith. F F′ are the arms attached to the ends A A′ and back-frame B B′. G is the upholstered back of the sofa, as in Fig. 1. This upholstering is attached to a light frame, O, as seen in Fig. 2. This frame fits within the outer finish-frame B B′ C when in position as a sofa, Fig. 1. Near its lower end is applied a small friction-pulley, *n*, which supports it in an upright position and allows it to be turned down, while a groove, V, in the inside of end piece A admits of its being drawn forward one-half of its width or length, and resting upon a projection on the inner side of end piece A, while the pulley *n* has a bearing upon the top of the groove V, prevents it from tipping down, and supports it firmly in a horizontal position. In this position its upholstered side J is uppermost, the springs Z Z Z being confined between webbings *e e e e*, between the upholstered sides G and J. *t t* represent a case back of frame B B′ C, and connected therewith. To the back of this case is hinged the pillow-board *r*, which is in the position shown in Fig. 2 by the dotted lines when in use as a sofa, but can be turned down, as shown in section, Fig. 2, with its outer edge resting upon the end *o* of the frame containing the upholstering J G, thus filling up the vacant space or opening produced by drawing forward the back after its being turned, as before alluded to. T is a cross-rail connecting the rear of end pieces A A′, being placed forward sufficiently to allow the mattress or back G J to pass in its rear when turned up, as in Fig. 1, or as shown by dotted lines in Fig. 2. P is a drawer underneath the seat E for holding the necessary bed-linen when not in use as a bed.

It will be observed that, by constructing a sofa-bed in this manner, I am enabled to confine the length of the sofa, when in use as such, to the width of the bedstead desired, instead of its length, which gives the sofa a very neat and unique appearance.

Having thus fully described my invention, what I claim as new, and desire to secure by Letters Patent, is—

1. The sofa-back frame O, set upright within the back finish-frame B B′ C, having a friction-pulley, *n*, and sliding in groove V of end piece A to the extent described, for the purpose of serving both as the upholstered back of sofa and as part of bed, as set forth.

2. The combination of the detachable frame, having four legs, with the back-frame or bed O and the sofa-frame A B C, as and for the purpose specified.

To the above specification of my invention I have signed my hand this 8th day of June, A. D. 1872.

MARK CROSBY.

Witnesses:
SOLON C. KEMON,
CHAS. A. PETTIT.